F. KUHN.
Billiard-Cue Tip.

No. 215,061.  Patented May 6, 1879.

Figure 1:
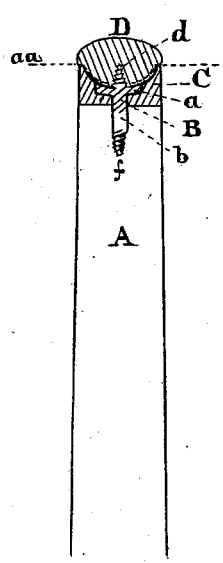

Sec. on line aa fig. 1

Witnesses.
Rena Thurlow
Luther Thurlow

Frank Kuhn
by E. Thurlow, atty.

UNITED STATES PATENT OFFICE.

FRANK KUHN, OF METAMORA, ILLINOIS.

IMPROVEMENT IN BILLIARD-CUE TIPS.

Specification forming part of Letters Patent No. 215,061, dated May 6, 1879; application filed November 1, 1878.

*To all whom it may concern:*

Be it known that I, FRANK KUHN, of Metamora, in the county of Woodford, in the State of Illinois, have invented an Improvement in Billiard-Cue Tips; and do hereby declare that the following is a full, clear, and exact description thereof, reference being had to the annexed drawings, making a part of this specification, in which like letters of reference refer to like parts, and in which—

Figure 2:
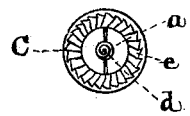

Figure 1 represents a longitudinal section; Fig. 2, a cross-section on line $a\ a$, Fig. 1, the tip being removed.

The object of this invention is to provide a series of devices, operating collectively, to prevent the leather or elastic tip of a billiard-cue from falling off the same by repeated blows upon the billiard balls or table.

The invention consists of a double-ended screw or pin, having a screw-thread at either end, and a medial collar or milled cup to receive a lens-shaped or spheroidal tip. This cup, however, may be made separately from the collar, and to surround said collar (as a ferrule) and form a bed or socket for the reception of said collar. The collar (if used with the ferrule) rests at the bottom of the latter in a proper socket, said ferrule being of the same diameter as that of the cue at that part, and is provided with serrations in its cup-like cavity, which incline diagonally downward (in a contrary inclination to the thread of the screw) in such a manner that the tip is locked and prevented from rotating backward so as to fall off.

As said above, the screw and ferrule may be made in one piece with good effect. The lenticular or spheroidal tip is so made of that form to rest a great part of its body within said cup, by which it is prevented from expanding by means of continual blows, and maintains for a much longer time than ordinarily its required rounded outer surface, at the same time that said blows only tend to more securely lock said tip upon its screw, and the arrangement of annular serrations or teeth inclined at a contrary angle to the thread of the screw, which enters the tip proper.

In the drawings. A is the cue; B, the screw, having threads $d\ f$ at each end, and a collar, $a$, near its upper end, which rests in the bottom of the ferrule C; C, the ferrule, perforated to admit the screw B, and corrugated or incised with inclined teeth $e$ in a contrary direction to that of the thread or screw $d$; D, the tip, made of a lenticular or spheroidal form, and preferably with a circumferential recess to admit the outer edge of said ferrule C, for neatness and for the better covering of said ferrule.

The collar $a$ may have radial notches or recesses for the application of a screw-driver in inserting said screw $f$ into the cue.

What I claim as my invention is—

1. A lenticular-formed billiard-tip, screwed upon a central screw within a cup-shaped socket, so that a great portion of the tip is within said cavity, substantially as described.

2. A double-ended screw and flange, B, screwing at one end into the cue and into the tip at the other end, with a cup-shaped cavity to receive the rounded lower half of said tip, substantially as and for the purposes described.

3. The milled or corrugated collar C, milled in its interior in a reverse direction to that of a central screw, B $d$, for the purpose of locking the tip proper, as described.

In testimony that I claim the foregoing billiard-cue tip I have hereunto set my hand this 21st day of October, 1878.

FRANK KUHN.

Witnesses:
J. M. MONROE,
JOHN VALENTINE.